United States Patent

Werbelow et al.

Patent Number: 5,362,100
Date of Patent: Nov. 8, 1994

[54] CONTROL CIRCUIT FOR A COMPRESSED GAS INFLATOR DEVICE

[75] Inventors: Joel M. Werbelow, Vandalia; James K. Conlee, Dayton; Jeffrey A. Shepherd, Fairborn, all of Ohio

[73] Assignee: General Motors Corporation, Detroit, Mich.

[21] Appl. No.: 140,947

[22] Filed: Oct. 25, 1993

[51] Int. Cl.$^5$ .............................................. B60R 21/10
[52] U.S. Cl. ...................................... 280/741; 280/736
[58] Field of Search ................. 280/736, 737, 741, 742

[56] References Cited

U.S. PATENT DOCUMENTS

| | | | |
|---|---|---|---|
| 5,022,674 | 6/1991 | Frantom et al. | 280/741 |
| 5,031,932 | 7/1991 | Frantom et al. | 280/741 |
| 5,033,772 | 7/1991 | Frantom et al. | 280/737 |
| 5,060,974 | 10/1991 | Hamilton et al. | 280/736 |
| 5,066,038 | 11/1991 | Frantom et al. | 200/737 |
| 5,076,607 | 12/1991 | Woods et al. | 280/737 |
| 5,078,422 | 1/1992 | Hamilton et al. | 280/736 |
| 5,199,740 | 4/1993 | Frantom et al. | 280/736 |

FOREIGN PATENT DOCUMENTS

| | | |
|---|---|---|
| WO92/02387 | 2/1992 | WIPO . |
| WO92/09459 | 6/1992 | WIPO . |
| WO92/22441 | 12/1992 | WIPO . |
| WO93/11973 | 6/1993 | WIPO . |

*Primary Examiner*—Kenneth R. Rice
*Attorney, Agent, or Firm*—Anthony L. Simon

[57] ABSTRACT

A supplemental inflatable restraint system including a compressed gas storage unit containing a compressed gas at a pressure and a two-state pressure switch attached to the compressed gas storage unit and responsive to the pressure of the compressed gas, the two-state pressure switch having a closed state in which current flows through the switch when the pressure of the compressed gas is above a threshold and an open state in which current does not flow through the switch when the pressure of the compressed gas is below the threshold includes a control circuit wherein a diode is connected in parallel with the pressure switch to form a parallel circuit with the pressure switch, an initiator is coupled in series with the parallel circuit of the diode and the pressure switch, a first electric line is connected to a first end of the series circuit and a second electric line is connected to a second end of the series circuit, wherein the series circuit has a first impedance when the pressure switch is closed, indicating that the pressure of the compressed gas is above the threshold, wherein the series circuit has a second impedance when the pressure switch is open, indicating that the pressure of the compressed gas is below the threshold, wherein if the switch is closed and a potential is provided across the first and second lines, current flows through the first line, the switch, the initiator and the second line and wherein if the switch is opened and the potential is provided across the first and second lines, current flows through the first line, the diode, the initiator and the second line.

2 Claims, 2 Drawing Sheets 5,362,100

CONTROL CIRCUIT FOR A COMPRESSED GAS INFLATOR DEVICE

This invention relates to a compressed gas supplemental inflatable restraint inflator and more particularly to a circuit advantageous in both the control and diagnostics of a compressed gas supplemental inflatable restraint inflator.

BACKGROUND OF THE INVENTION

It has been suggested to deploy a supplemental inflatable restraint using a source of compressed gas, which compressed gas is released by a control signal activating an initiator. When the compressed gas is released, the gas flows out of its storage chamber to a supplemental inflatable restraint air bag to cause inflation of the air bag. Various publications show devices aimed at achieving these ends.

It has been suggested to implement a compressed gas supplemental inflatable restraint system as shown schematically in FIG. 1. Control module 10 controls and/or monitors the supplemental inflatable restraint system and typically includes a microprocessor 12. The deployment system includes a compressed gas source 18 comprising a chamber 20 in which compressed gas 22 is stored, typically at a pressure in the range of 1,000–4,000 pounds per square inch. The storage container 18 includes a pressure switch 24 located therein. Pressure switch 24 is a two-state switch responsive to the pressure of gas 22 within chamber 20 and is closed as long as the pressure of the compressed gas 22 is maintained above a threshold level. The threshold level is set as a system designer desires. Pressure switch 24 is opened when the pressure of gas 22 within chamber 20 falls below the predetermined threshold level. Two lines 14 (i.e., electrically conductive wires) couple pressure switch 24 to control module 10, allowing control module 10 to monitor the state of pressure switch 24. Two lines 16 are shown coupled to initiator 26, which typically comprises a squib and a combustible propellant that, when activated, provides an escape path for gas 22 from chamber 20 to air bag 28, allowing the gas to forcibly inflate air bag 28. When inflating, air bag 28 expands through cover door 30 and inflates in a manner well known to those skilled in the art. Through this manner of system control, four lines are required between the control module 10 and the deployment module 19. Two lines 14 allow control module 10 to monitor pressure switch 24 and two lines 16 allow control module 10 to control and monitor initiator 26.

SUMMARY OF THE PRESENT INVENTION

Advantageously, this invention provides a circuit useful in both the control and diagnostics of a compressed gas source supplemental inflatable restraint system.

Advantageously, according to this invention, a control circuit is provided for a supplemental inflatable restraint system that eliminates the necessity of two pairs of lines (i.e. electrically conductive wires), or four lines total, to control and monitor the compressed gas source deployment unit that includes a pressure switch.

Advantageously, the compressed gas supplemental inflatable restraint control circuit, according to this invention includes a series circuit of the pressure switch and the initiator to reduce the number of lines necessary to monitor and control the deployment system from four to two.

Advantageously, the control circuit of this invention includes a series circuit of the pressure switch and initiator and allows activation of the initiator even when the pressure switch is open.

Advantageously, the apparatus of this invention, aimed at achieving the above stated advantages, comprises a compressed gas storage unit containing a compressed gas at a pressure; a two-state pressure switch attached to the compressed gas storage unit and responsive to the pressure of the compressed gas, the two-state pressure switch having a closed state in which current flows through the switch when the pressure of the compressed gas is above a threshold and an open state in which current does not flow through the switch when the pressure of the compressed gas is below the threshold; a diode connected in parallel with the pressure switch to form a parallel circuit with the pressure switch; an initiator coupled in series with the parallel circuit of the diode and the pressure switch; a first electric line connected to a first end of the series circuit; and a second electric line connected to a second end of the series circuit, wherein the series circuit has a first impedance when the pressure switch is closed, indicating that the pressure of the compressed gas is above the threshold, wherein the series circuit has a second impedance when the pressure switch is open, indicating that the pressure of the compressed gas is below the threshold, wherein if the switch is closed and a potential is provided across the first and second lines, current flows through the first line, the switch, the initiator and the second line and wherein if the switch is opened and the potential is provided across the first and second lines, current flows through the first line, the diode, the initiator and the second line.

A more detailed description of this invention, along with various embodiments thereof, is set forth below.

DETAILED DESCRIPTION OF THE INVENTION

Figure 2:
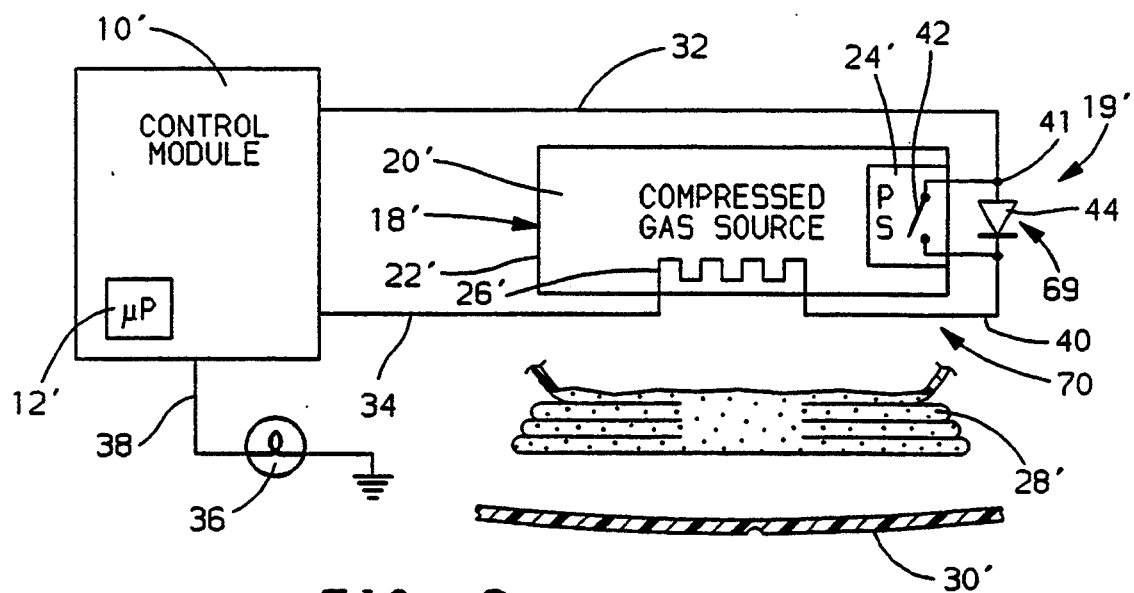
FIG. 2 illustrates schematically a compressed gas supplemental inflatable restraint deployment system including the control circuit of this invention.

Referring now to FIG. 2, the schematic of a compressed gas supplemental inflatable restraint system shown including the control circuit of this invention comprises control module 10', including microprocessor 12', and compressed gas supplemental inflatable restraint deployment unit 19'. The control module 10' performs a diagnostic function on the deployment unit 19' by providing a small current to the deployment unit 19' through two electric conductive lines 32 and 34. As the small current is applied to the deployment unit, control module 10' monitors the impedance of the deployment unit control circuit, comprising switch 42, diode 44 and initiator 26'. Responsive to the monitored impedance, control module 10' determines whether the deployment unit 19' is maintaining the gas 22' at a pressure above a predetermined threshold pressure. If the pressure of the compressed gas 22' is below the threshold pressure, control module 10' illuminates telltale 36. This diagnostic function performed by control module 10' in response to the monitored impedance of the deployment unit 19' is explained in more detail below.

The control module 10' may either be of an active or passive type. Passive control modules, in general, do not actively control deployment of the supplemental inflatable restraint. Instead, active deployment is controlled by another means such as one or more electromechanical actuators, which typically comprise switches that close when subjected to a threshold acceleration. In passive implementations, control module 10' operates as a diagnostic module and a record module to record a deployment event. If the diagnostic operations determine that there is a fault in the deployment system, a signal is provided on line 38 to illuminate tell-tale 36.

Active control modules 10' typically monitor vehicle accelerations, determine if a deployment of the supplemental inflatable restraint is desired and activate the deployment system by commanding current to pass through the initiator 26'. Active control modules also include diagnostic and deployment event recording functions. Many suitable active and passive control modules are readily available to those skilled in the art, are currently available in automotive supplemental inflatable restraint systems and therefore need not be set forth in more detail herein.

The compressed gas deployment unit 19' includes compressed gas container 18' having a chamber 20' in which a compressed gas 22' is stored at a pressure typically in the range of 1,000–4,000 pounds per square inch pressure. The actual pressure and the pressure range will vary from implementation to implementation as system constraints require.

According to this invention, pressure switch 24' includes a two-state switch, represented schematically by reference 42, that is closed when the gas 22' in vessel 20' is at pressure above a predetermined threshold set by a system designer sufficient to achieve a desired air bag deployment. When switch 42 is in the closed state, electric current flows through the switch. Switch 42 also has an open state in which current does not flow through the switch 42. Switch 42 is in the open state when the pressure of the compressed gas is below the threshold pressure.

Diode 44 is connected in parallel with the switch 42 so that the switch 42 and diode 44 comprise a parallel circuit 69. The parallel circuit 69 of the switch 42 and diode 44 has a first impedance if the switch is closed and a second impedance if the switch is open. The impedance of the parallel circuit 69 comprising the switch 42 and diode 44 also depends upon the direction of current flow through the circuit.

For example, in a first implementation of this invention, assume that control module 10' provides a diagnostic current through the parallel circuit 69 in a first direction equal to the forward-bias direction of the diode 44. The impedance of the parallel circuit 69 when the switch 42 is closed, is very small, close to zero ohms, and when the switch 42 is opened, the impedance of the parallel circuit 69 equals 1 or 2 ohms depending on the forward bias impedance of diode 44. When the switch 42 is closed and a potential is provided across the first and second lines 32 and 34, current flows through the first line 32, the switch 42 (and some current through diode 44), the initiator 26' and the second line 34. When the switch 42 is opened and the potential is provided across the first and second lines 32 and 34, current flows through the first line 32, the diode 44, the initiator 26' and the second line 34.

In a second implementation of this invention in which the diagnostic current flows through the parallel circuit 69 in the direction opposite the forward-bias direction of diode 44. When switch 42 is closed, the impedance of the parallel circuit 69 is very small, close to zero ohms. When switch 42 is open, the impedance of the parallel circuit 69 is very high, approaching infinity, since current will flow neither through the open switch 42 nor through the reverse biased diode 44.

A line 40 connects the series circuit 70 of the switch 42 and diode 44 to the initiator 26'. Initiator 26' typically comprises a squib of low impedance, i.e., typically in the range of 2 ohms. The squib typically activates a combustible propellant in a manner known to those skilled in the art. For example, when a deployment current (i.e., on the order of 2 amperes) flows through the squib, the squib ignites the combustible propellant, which controls in a known manner the release of compressed gas from the vessel 20'. In one known technique, the propellant drives a piston that ruptures a seal, allowing the gas to escape and flow through a manifold into the air bag 28', forcing the air bag 28' to inflate, which process involves the forcing open of the cover doors 30 by the air bag 28'. Such apparatus are known to those skilled in the art and are detailed in various publications. An example apparatus is set forth in International Patent Application Publication No. WO93/11973, the disclosure of which is incorporated herein by reference. While this publication discloses one compressed gas deployment system, those skilled in the art will readily appreciate that any compressed gas deployment system that includes an initiator and a two-state pressure switch can be used with this invention.

Line 40 couples initiator 26' to the parallel circuit 69 comprising the switch 42 and diode 44 to form a series circuit 70. A first line 32 couples node 41 at a first end of the series circuit 70 to control module 10'. A second line 34 is connected to the end of the initiator 26 that is not connected to line 40, and couples initiator 26 and the series circuit 70 to control module 10'.

As shown in FIG. 2, only two lines 32 and 34 are connected to the control circuit comprising both the initiator 26' and the pressure switch 42. Through the two lines 32 and 34, the state of the deployment system can be monitored and the deployment system can be controlled or activated. To monitor the state of the deployment system, the impedance of the series circuit 70 of the initiator 26' and the parallel circuit 69 comprising switch 42 and diode 44 is monitored.

Figure 3:
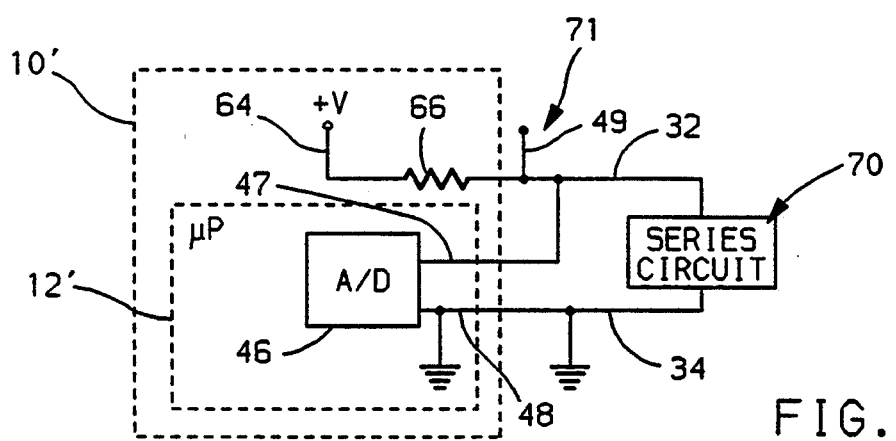
FIG. 3 illustrates an example implementation of this invention.

Referring now also to FIG. 3, control module 10' monitors the impedance of the series circuit 70 by applying a small current to the series circuit 70 and monitoring the voltage across the series circuit 70. Microprocessor 12' has an internal A/D converter 46 coupled through lines 47 and 48 to lines 32 and 34 across the series circuit 70 comprising initiator 26' and the parallel circuit 69 including switch 42 and diode 44. Microprocessors including internal A/D converters are readily available to those skilled in the art. A voltage is applied to line 64 so that resistor 66 and the series circuit 70 comprising initiator 26' and the parallel circuit 69 including switch 42 and diode 44 comprise a voltage divider 71. The voltage applied to line 64 is very low so as to provide only a few milliamperes of current through the circuit and to not activate deployment of the supplemental inflatable restraint. When switch 42 is closed, the series circuit 70 comprising initiator 26' and the parallel circuit 69 of switch 42 and diode 44 has a first impedance. When the series circuit 70 has the first impedance, the voltage divider 71 provides a first voltage between lines 47 and 48 to the; A/D converter 46, which responsively provides a first digital signal having a first value that is processed by microprocessor 12'. When switch 42 is open, the series circuit 70 comprising initiator 26' and the parallel circuit 69 of switch 42 and diode 44 has a second impedance. In response to the second impedance of series circuit 70, voltage divider 71 provides a second voltage across lines 47 and 48 to the input of A/D converter 46, which responsively provides a second digital signal having a second value. The second voltage across lines 47 and 48 occurring when switch 42 is open is greater than the first voltage when switch 42 is closed. Microprocessor 12' receives the output signals from A/D converter 46 and compares the signals to a threshold value. The threshold value is set to correspond to a value between the first and second values of the first and second digital signals. Thus when the A/D output is below the threshold, the control module 10' recognizes that the switch 42 is closed and that the pressure of the gas 22' is above the threshold pressure. Likewise when the A/D output is above the threshold value, the control module 10' recognizes that switch 42 is open and that the pressure of gas 22' within chamber 20' is below the threshold pressure. When control module 10' determines that the pressure of gas 22' is below the threshold pressure, telltale 36 is commanded on.

As an example, assume that initiator has an impedance of 2 ohms, that the switch has an impedance of 0 ohms when closed, infinity when open and that the forward bias impedance of the diode 44 is 1 ohm. When the switch is closed, and assuming the series circuit 70 is forward biased, the impedance of the series circuit 70 is 2 ohms plus the line impedances (of lines 32, 34 and 40). When the switch is open, the impedance of the series circuit 70 is 3 ohms plus the line impedances. This change in impedance of the series circuit 70 between when switch 42 is open and when switch 42 is closed provides a signal detectable by microprocessor 12' indicative of the state of switch 42 and therefore of the pressure of compressed gas within chamber 20'.

In another example, assume that a small reverse bias voltage is applied across the series circuit 70 of the initiator 26' and the parallel circuit 69 comprising switch 42 and diode 44 as a diagnostic voltage. The resulting impedance of the series circuit 70 is 2 ohms plus line impedances when switch 42 is closed and substantially infinity when the switch 42 is opened. In either of these two implementations, the impedance can be readily detected by control module 10'.

In addition to providing diagnostic currents to the deployment unit, lines 32 and 34 also provide a path for an activation currents suitable for initiating deployment of the air bag 28'. Control of activation currents may be provided by any manner known to those skilled in the art. For example, one or more electromechanical actuators of a known type for use in supplemental inflatable restraint systems can be coupled between a source of high current in line 32 and/or line 34 to provide a high current path through the series circuit 70 in response to closing of the internal switches of the electromechanical actuators. As an alternative, a solid state switch coupled between a high current source and line 32 may be activated to provide a high current flow through the series circuit 70, activation of initiator 26' and deployment of air bag 28'. Many techniques for achieving either implementation for providing an initiator activation current are known to and can be readily implemented by those skilled in the art.

Figure 4:
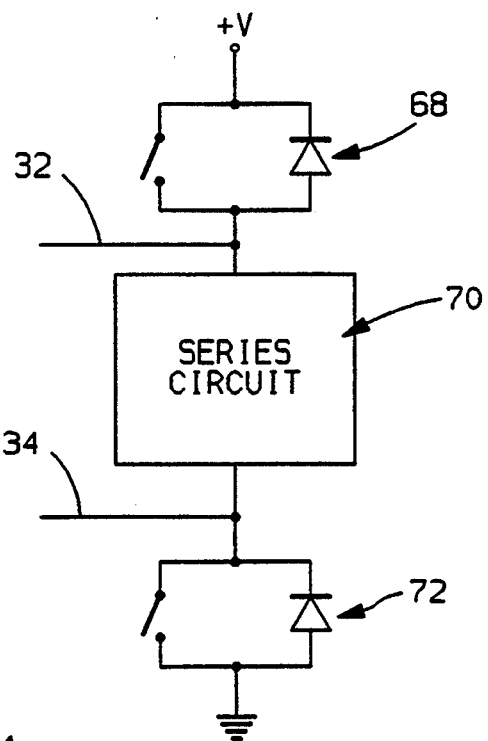
FIG. 4 illustrates an example deployment circuit for use with this invention.

FIG. 4 illustrates an example implementation employing electromechanical actuators 68 and 72 in series with the series circuit 70. The deployment circuit comprising actuators 68 and 72 and series circuit 70 is coupled between a current source and ground. The current source typically includes a backup current source implemented in a manner well known to those skilled in the art for use to activate deployment in the event of a battery disconnect.

Figure 5:
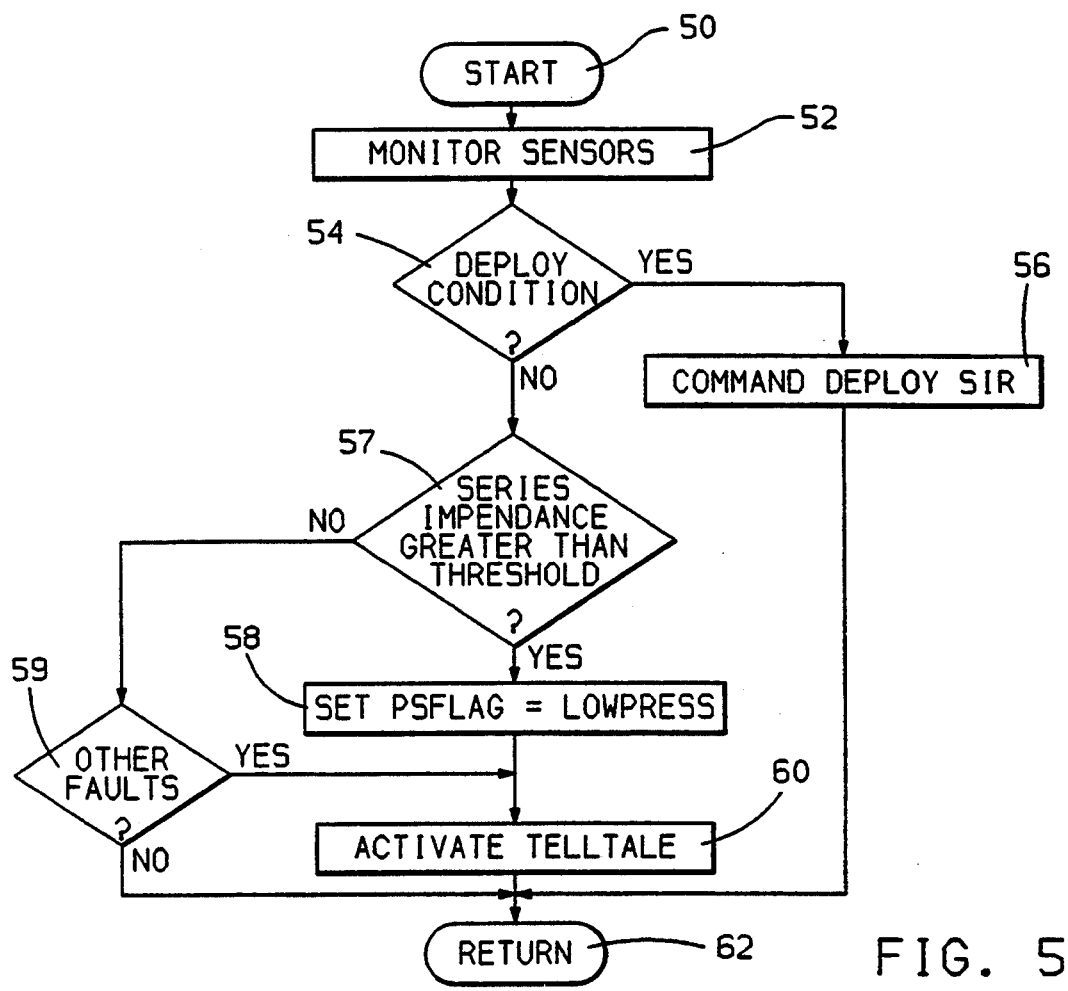
FIG. 5 illustrates a flow diagram for use by a control unit associated with a compressed gas supplemental inflatable restraint system including the control circuit of this invention.

Referring to FIG. 5, a flow diagram illustrating a control routine for microprocessor 12' for use in this invention starts at block 50 and moves to block 52 where system sensors are monitored. At block 52, the impedance of the series circuit 70 comprising initiator 26' and the parallel circuit 69 of the switch 42 and diode 44 is read by the microprocessor 12', along with any other system parameters that one skilled in the art may desire to monitor.

When control module 10' is implemented as an active module, blocks 54 and 56 are implemented. At block 54, the control module determines in a known manner if a deployment condition exists. If a deployment condition exists, the routine moves to block 56 where a command is provided on line 32 (FIG. 2), which command comprises a high current pulse to activate initiator 26', causing the release of compressed gas from vessel 18' into air bag 28' and causing the inflation of the air bag 28'. If there is no deployment condition or the system is a passive system, the routine moves to block 57 where it determines if the series impedance, represented by the voltage across lines 32 and 34 (and lines 47 and 48, FIG. 3) is greater than a threshold level. A series impedance below the threshold level indicates that the switch 42 is closed and that the vessel retains the gas 22' at a pressure above the threshold pressure.

The routine then moves to block 59 to determine whether there are other faults sensed at block 52 by any additional known diagnostic functions that may be desirable to implement in the particular system used. These additional diagnostic functions may be any of a variety of known functions readily available to and easily implemented by those skilled in the art. If no other faults are detected, the routine moves from block 59 to block 62 and is exited. If faults are detected at block 59, the routine moves from block 59 to block 60 and activates the tell-tale. The routine then moves to block 62 and is exited. If, at block 57, the series impedance is greater than the threshold level, indicating that pressure in the vessel 18' is below the threshold level, a flag is set at block 58 and the tell-tale is activated at block 60.

According to this invention, even though the pressure switch 42 may be open and indicating that pressure in the vessel 18' is lower than the threshold pressure, deployment of the supplemental inflatable restraint is still commanded when control unit 10' determines that deployment is desirable. The control circuit according to this invention shown in FIG. 2, allows such a deployment even if switch 42 is opened.

Figure 1:
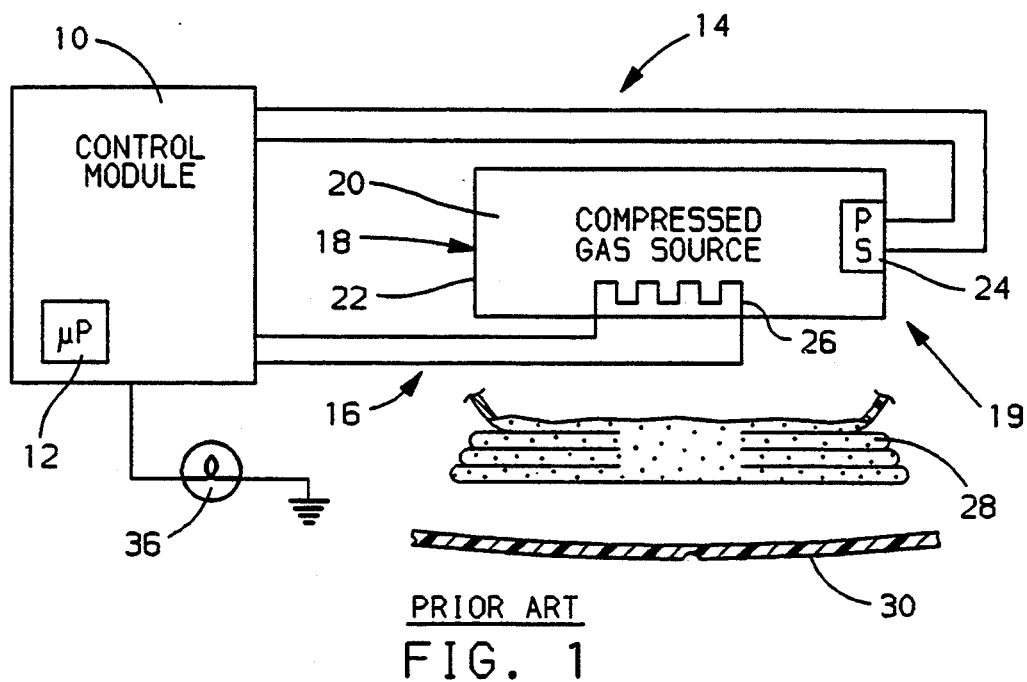
FIG. 1 illustrates an example prior art apparatus.

FIG. 2 illustrates that only two lines are necessary to couple the control module 10' to the deployment unit 19'. This compares to four lines shown in the system in FIG. 1. Additionally, the inclusion of the diode 44 allows the two lines 32 and 34 to be used for both diagnostics and for control of deployment of the supplemental inflatable restraint. Further, this invention allows deployment of the supplemental inflatable restraint with the switch 24' and initiator 26' connected in series and when the pressure of the gas 22' in the chamber 20' is below the threshold pressure required to hold the switch 42 closed.

The above-described implementations of this invention are example implementations and are not limiting in the scope of this invention. Moreover, various other improvements and modifications to this invention may occur to those skilled in the art and will fall within the scope of this invention as set forth below.

The embodiments of the invention in which an exclusive property or privilege is claimed are defined as follows:

1. An apparatus comprising:
   a compressed gas storage unit containing a compressed gas at a pressure;
   a two-state pressure switch attached to the compressed gas storage unit and responsive to the pressure of the compressed gas, the two-state pressure switch having a closed state in which current flows through the switch when the pressure of the compressed gas is above a threshold and an open state in which current does not flow through the switch when the pressure of the compressed gas is below the threshold;
   a diode connected in parallel with the pressure switch to form a parallel circuit with the pressure switch;
   an initiator coupled in series with the parallel circuit of the diode and the pressure switch;
   a first electric line connected to a first end of the series circuit; and
   a second electric line connected to a second end of the series circuit,
   wherein the series circuit has a first impedance when the pressure switch is closed, indicating that the pressure of the compressed gas is above the threshold,
   wherein the series circuit has a second impedance when the pressure switch is open, indicating that the pressure of the compressed gas is below the threshold,
   wherein, when the switch is closed and a potential is provided across the first and second lines, current flows through the first line, the switch, the initiator and the second line and
   wherein, when the switch is opened and the potential is provided across the first and second lines, current flows through the first line, the diode, the initiator and the second line.

2. An apparatus comprising:
   a compressed gas storage unit containing a compressed gas at a pressure;
   a two-state pressure switch attached to the compressed gas storage unit and responsive to the pressure of the compressed gas, the two-state pressure switch having a closed state in which current flows through the switch when the pressure of the compressed gas is above a threshold and an open state in which current does not flow through the switch when the pressure of the compressed gas is below the threshold;
   a diode connected in parallel with the pressure switch to form a parallel circuit with the pressure switch;
   an initiator coupled in series with the parallel circuit of the diode and the pressure switch;
   a first electric line connected to a first end of the series circuit; and
   a second electric line connected to a second end of the series circuit,
   wherein the series circuit has a first impedance when the pressure switch is closed, indicating that the pressure of the compressed gas is above the threshold,
   wherein the series circuit has a second impedance when the pressure switch is open, indicating that the pressure of the compressed gas is below the threshold.

* * * * *